United States Patent [19]

Saito et al.

[11] Patent Number: 5,002,995

[45] Date of Patent: Mar. 26, 1991

[54] ACRYLIC RUBBER COMPOSITION

[75] Inventors: Masayuki Saito, Gunma; Keiji Yoshida; Mitsuo Hamada, both of Chiba, all of Japan

[73] Assignee: Toray Silicone Company, Limited, Tokyo, Japan

[21] Appl. No.: 420,984

[22] Filed: Oct. 13, 1989

[30] Foreign Application Priority Data

Oct. 18, 1988 [JP] Japan ................................. 63-261907

[51] Int. Cl.$^5$ ............................................... C08K 3/26
[52] U.S. Cl. .................................... 524/425; 524/445; 524/588; 525/100
[58] Field of Search ................ 525/100; 524/588, 425, 524/445

[56] References Cited

U.S. PATENT DOCUMENTS

| | | | |
|---|---|---|---|
| 4,701,503 | 10/1987 | Sato et al. | 524/588 |
| 4,743,670 | 5/1988 | Yoshida et al. | 528/15 |
| 4,749,765 | 6/1988 | Shimizu et al. | 528/15 |
| 4,761,447 | 8/1988 | Shen et al. | 524/425 |
| 4,761,454 | 8/1988 | Oba et al. | 524/862 |
| 4,849,564 | 7/1989 | Shimizu et al. | 524/114 |

*Primary Examiner*—Melvyn I. Marquis
*Assistant Examiner*—M. Glass
*Attorney, Agent, or Firm*—Edward C. Elliott

[57] ABSTRACT

An acrylic rubber composition containing an amino group-containing silicon compound is characterized by excellent roll workability and a rapid vulcanization rate and characteristically does not require secondary vulcanization.

6 Claims, No Drawings

ACRYLIC RUBBER COMPOSITION

BACKGROUND OF THE INVENTION

1. Field of the Invention

This invention relates to an acrylic rubber composition.

2. Background Information

Because they have excellent mechanical properties as well as excellent electrical insulation properties and an excellent oil resistance, etc., acrylic rubbers are used with good results in, for example, automobile parts, etc. However, this type of rubber suffers from a poor roll workability or processability. It also suffers from a slow vulcanization rate, and, in order to bring vulcanization to completion, a lengthy secondary vulcanization must be conducted after primary vulcanization.

Methods for producing silicone rubber powder are described in U.S. Pat. No. 4,743,670, issued May 10, 1988, in U.S. Pat. No. 4,749,765, issued June 7, 1988, in U.S. Pat. No. 4,761,454, issued Aug. 2, 1988, and in U.S. Pat. No. 4,849,564, issued July 18, 1989.

SUMMARY OF THE INVENTION

The present invention produces an acrylic rubber composition which has an excellent roll processability or workability and which also has such a rapid vulcanization rate that secondary vulcanization becomes unnecessary.

DESCRIPTION OF THE INVENTION

This invention relates to an acrylic rubber composition comprising (A) 100 weight parts acrylic rubber, (B) 0.5 to 30 weight parts cured silicone particulate containing an amino group-containing silicon compound, (C) 10 to 150 weight parts reinforcing filler, and (D) vulcanizing agent in a quantity sufficient to vulcanize component (A).

To explain the preceding in greater detail, acrylic rubber comprising the component (A) used by the present invention encompasses acrylic rubber which has alkyl acrylate as the main or principal component and which is capable of curing to give a rubbery elastic material.

Acrylic rubbers in this regard include rubbers of alkyl acrylate esters as typified by butyl acrylate, etc., copolymers between acrylate ester and 2-chloroethyl vinyl ether, and copolymers between acrylate ester and acrylonitrile.

The cured silicone comprising the component (B) used by the present invention is the component which distinguishes the present invention, and it is essential that it contain an amino group-containing silicon compound. No particular restriction obtains on this amino group-containing silicon compound as long as it is compatible with the cured silicone or the organopolysiloxane constituting the cured silicone. Amino group-containing silicon compounds in this regard are exemplified by amino group-containing organoalkoxysilanes such as gamma-aminopropyltrimethoxysilane, gamma-aminopropyltriethoxysilane, N-beta-(aminoethyl)-gamma-aminopropylmethyldimethoxysilane, and N,N-dibutylaminoethyltrimethoxysilane; by organopolysiloxane comprising the partial hydrolysis condensate of the preceding; and by organopolysiloxane containing aminoalkyl at the molecular terminals or pendant.

The above amino group-containing silicon compound is to be added to a silicone which can be cured at 0.1 to 10 weight parts and preferably within the range of 0.5 to 5 weight parts per 100 parts of the silicone which can be cured.

The silicone constituting the cured silicone may be a silicone rubber, silicone gel, or silicone resin. The silicone rubber comprises addition-curing silicone rubbers, organoperoxide-curing silicone rubbers, and condensation-curing silicone rubbers, and the silicone gel and silicone resin are the corresponding addition-curing, organoperoxide-curing, and condensation-curing materials.

Addition-cured silicone rubber is typically obtained by curing a silicone rubber composition based on organopolysiloxane containing silicon-bonded alkenyl, organohydrogenpolysiloxane containing silicon-bonded hydrogen, and a platinum-type catalyst, and optionally also containing reinforcing filler.

Organoperoxide-cured silicone rubber is typically obtained by curing a silicone rubber composition based on organoperoxide and vinyl-containing organopolysiloxane, and optionally also containing reinforcing filler. Condensation-cured silicone rubber is typically obtained by curing a silicone rubber composition based on silanol-containing organopolysiloxane, organohydrogenpolysiloxane or alkoxysilane, and curing catalyst, and optionally also containing reinforcing filler.

The cured silicone comprising the component (B) used by the present invention preferably has an average diameter not exceeding 100 micrometers. Furthermore, it is to be added within the range of 0.5 to 30 weight parts and preferably within the range of 1.0 to 20 weight parts per 100 weight parts acrylic rubber comprising component (A). The development of a functional effect is not observed for a component (B) addition of less than 0.5 weight parts. On the other hand, the roll processability in fact deteriorates in excess of 30 weight parts.

A number of methods exist for the preparation of the component (B) used by the present invention, and any of these may be used within the context of the present invention. As an example of these methods, a silicone rubber composition as described above and an amino group-containing silicon compound as described above are first blended to prepare a silicone rubber composition containing an amino group-containing silicon compound. This composition is then introduced into water with mixing to homogeneity by some mixing means, for example, a colloid mill or homomixer, to give a water-based dispersion of the silicone rubber composition containing an amino group-containing silicon compound. This water-based dispersion is itself subsequently dispersed in water residing at a temperature of at least 50 degrees Centigrade, or is sprayed into a high-temperature air stream, in order to induce curing of the silicone rubber composition containing an amino group-containing silicon compound. Alternately, the aforesaid silicone rubber composition containing an amino group-containing silicon compound can be directly cured as such, and the obtained cured product can be mechanically ground or pulverized. Methods of preparing silicone rubber powder are further described in U.S. Pat. Nos. 4,743,670 and 4,749,765, which are incorporated by reference to show methods of preparing silicone rubber powder.

Component (C) comprises from 10 to 150 weight parts of reinforcing filler. This filler can be any of the well known materials for the reinforcement of rubber.

Examples of reinforcing filler include fume silica, precipitated silica, calcium carbonate, talc, clay, and carbon black.

Vulcanizing agent comprising the component (D) to be used by the present invention is not particularly restricted as long as it can cure component (A). As a general matter, this vulcanizing agent encompasses the various vulcanizing agents used as such for typical acrylic rubbers such as, for example, ammonium compounds, carbamic acid compounds, amine compounds, metal soaps, sulfur, sulfonamide derivatives, red lead, mercaptoimidazoline, organoperoxides, etc. Concrete examples of the vulcanizing agent are ammonium benzoate, zinc dimethyldithiocarbamate, iron dimethyldithiocarbamate, sulfonamide derivatives, hexamethylenediamine carbamate, N,N'-dicinnamylidene-1,6-hexanediamine, hexamethylenetetramine, red lead oxide, 2-mercaptoimidazoline, sodium stearate, potassium stearate, dicumyl peroxide, alpha,alpha'-bis(tert-butylperoxy)diisopropylbenzene, 2,5-dimethyl-2,5-di(tert-butylperoxy)hexane, sulfur, sulfur chloride, and sulfur dichloride. This component should be added in a quantity sufficient to bring about the vulcanization of component (A), generally at 0.1 to 15 weight parts per 100 weight parts component (A). Furthermore, the above vulcanizing agents can be used in the form of the single species or as mixtures of several species. The co-use of a vulcanization auxiliary corresponding to the vulcanizing agent is also preferred.

A general rubber antioxidant may also be compounded within the context of the present invention in addition to the aforementioned components (A) through (D). This component comprises already known antioxidants, and no particular restriction applies here. Examples of the antioxidant are 2,2,4-trimethyl-1,2-dihydroquinoline polymers, N,N'-dinaphthyl-p-phenylenediamine, diphenylamine derivatives, N-phenyl-N'-isopropyl-p-phenylenediamine, 4,4'-bis(4,alpha,alpha'-dimethylbenzyl)diphenylamine, N-(3-methacryloxy-2-hydroxypropyl)-N'-phenyl-p-phenylenediamine, nickel dibutylcarbamate, and 2-mercaptobenzimidazole.

A rubber softener may also be compounded within the context of the present invention in addition to the aforementioned components (A) through (D). This component comprises those softeners already in general use as rubber softeners, and no particular restriction obtains here. This softener is exemplified by petroleum-based softeners such as process oil, lubricating oil, synthetic lubricating oil, paraffins, liquid paraffins, petroleum asphalt, and vaseline; coal tar-based softeners such as coal tar and coal tar pitch; waxes such as tall oil, factice, beeswax, carnauba wax, and lanolin; fatty acids and fatty acid salts such as ricinoleic acid, palmitic acid, barium stearate, calcium stearate, and zinc laurate; synthetic polymers such as petroleum resins, atactic polypropylene, coumarone-indene resins, polyester resins, an silicone resins such as organopolysiloxanes, etc.; ester-type plasticizers such as dioctyl adipate, dioctyl phthalate, etc.; and also microcrystalline wax.

The acrylic rubber composition of the present invention can be prepared simply by mixing the aforementioned components (A) through (D) to homogeneity. For example, after the aforementioned components (A) through (C), with any of the various optional additives, have been blended and kneaded for 3 to 20 minutes at 80 to 170 degrees Centigrade using a Banbury mixer, the vulcanizing agent and vulcanizing auxiliary are then blended in using an open roll, and the vulcanizable rubber composition is taken off in ribbon or sheet form. With regard to the method for vulcanizing the acrylic rubber composition of the present invention, acrylic rubber composition prepared as described above is formed into the desired shape using an extruder, calender roll, press, etc., and this is then readily vulcanized by heating for 1 to 20 minutes at 150 to 270 degrees Centigrade.

The present invention's acrylic rubber composition as described above has an excellent roll workability or processability and a rapid vulcanization rate, and does not require secondary vulcanization. Upon vulcanization, it affords an acrylic rubber having excellent mechanical properties, an excellent heat resistance, and an excellent oil resistance. Accordingly, it is very suitable for use as a seal, gasket, hose, tubing, diaphragm, or boot, and also as an O-ring, oil seal, gasket, hose, or tubing for general industrial service.

The following examples are included for illustrative purposes only and should not be construed as limiting the invention which is properly set forth in the appended claims. In these examples, parts equals parts by weight.

EXAMPLE 1

A mixture (A) was prepared by mixing 95 parts of hydroxy-terminated dimethylpolysiloxane having a viscosity equal to 80 centipoise and a hydroxyl group content equal to 1.3 weight percent, 5 parts of gamma-(2-aminoethyl)aminopropyltrimethoxysilane, and 20 parts of dimethylhydrogensiloxy-terminated methylhydrogenpolysiloxane having a viscosity of 10 centistokes and a silicon-bonded hydrogen content of 1.5 weight percent.

A mixture (B) was prepared by adding and mixing 1.0 part dibutyltin dioctoate into 95 parts dimethylpolysiloxane as described above and 5 parts gamma-(2-aminoethyl)aminopropyltrimethoxysilane.

Mixtures (A) and (B) were subsequently placed in separate storage tanks, and these tanks were cooled to minus 10 degrees Centigrade. Then 500 Parts mixture (A) and 500 parts mixture (B) were fed to a static mixer and mixed to homogeneity. This homogeneous mixture was transferred to a colloid mill, where 20 parts of surfactant (ethylene oxide adduct on trimethylnonanol, from Union Carbide Corp.) and 6,000 parts of ion-exchanged water were simultaneously added, and a water-based dispersion of a silicone rubber composition was obtained by milling at 1,400 rpm on a 0.1 mm gap.

After this dispersion had stood at room temperature for 3 hours, it was processed through a spray drier, using a sprayer at 3 liter/hour into air at 300 degrees Centigrade in order to cure the silicone rubber composition in the atomized state. The product was 1,900 g of silicone rubber particulate with an average particle diameter of 5 micrometers.

The following ingredients were then introduced into a Banbury mixer and kneaded for 10 minutes at 100 to 150 degrees Centigrade: 100 parts butyl acrylate rubber (AR101 from Japan Synthetic Rubber Company, Limited), 50 parts HAF carbon (Asahi #70 from Asahi Chemical Company, Limited), 5 parts zinc oxide, 1 part stearic acid, and 3 parts of the above silicone rubber particulate. Then 0.4 part sulfur (vulcanizing agent) and 0.75 part tetraethylthiuram disulfide (vulcanization auxiliary) were mixed and kneaded into this mixture on a two-roll mill, thus affording an acrylic rubber composition. The roll workability was evaluated at the same time, with the result reported in Table 1.

In order to evaluate the vulcanization characteristics, this acrylic rubber composition was press vulcanized for 10 minutes at 170 degrees Centigrade (primary vulcanization) to give a rubber sheet with a thickness of 2 mm, and this rubber sheet was then heat-treated (secondary vulcanization) under the conditions reported in Table 1. The results are also reported in Table 1. The physical properties were measured according to the methods stipulated in JIS K 6301 (comparable to those found in ASTM D 2240 for hardness, ASTM D 412 for tensile strength and elongation, and ASTM D 624 for tear strength) on the sheet both after primary vulcanization and after secondary vulcanization, and these results are reported in Table 2.

For comparison, an acrylic rubber composition was prepared as above, but omitting the silicone rubber particulate. Its roll workability, vulcanization characteristics, and physical properties were also measured as above, and these results are also reported in Tables 1 and 2.

TABLE 1

| Item Measured | Present Invention | Comparison Example |
|---|---|---|
| roll workability | excellent | poor, strong adhesion to roll surface |
| roll working time to obtain a homogeneous composition (time required to obtain the acrylic rubber composition) | 10 minutes | 30 minutes |
| vulcanization characteristics | | |
| primary vulcanization | | |
| after 10 minutes at 170 degrees Centigrade | surface of the rubber sheet is not tacky | surface of the rubber sheet is tacky |
| secondary vulcanization | | |
| after 4 hours at 150 degrees Centigrade | surface of the rubber sheet is not tacky | surface of the rubber sheet is tacky |
| after 15 hours at 150 degrees Centigrade | surface of the rubber sheet is not tacky | surface of the rubber sheet is not tacky |

TABLE 2

| | Present Invention | | Comparison Example | |
|---|---|---|---|---|
| Item Measured | After Primary Vulcanization | After Secondary Vulcanization | After Primary Vulcanization | After Secondary Vulcanization |
| specific gravity | 1.30 | 1.30 | 1.31 | 1.31 |
| hardness (JIS), JIS A | 70 | 70 | 47 | 71 |
| tensile strength, kg/cm2 | 124 | 128 | 55 | 131 |
| tensile elongation, % | 470 | 455 | 900 | 452 |
| tear strength, kg/cm (type B) | — | 41 | — | 40 |

The results reported in Tables 1 and 2 demonstrate that the composition of the present invention has an excellent roll workability as well as a rapid vulcanization rate at the time of vulcanization, and, furthermore, that vulcanization is complete in primary vulcanization (170 degrees Centigrade/10 minutes) and a secondary vulcanization is unnecessary. As compared to this, the comparison composition adhered to the surface of the roll and had a slow vulcanization rate at the time of vulcanization. Furthermore, the latter's vulcanization was not completed by primary vulcanization (170 degrees Centigrade/10 minutes), and a secondary vulcanization was required.

That which is claimed is:

1. Acrylic rubber composition comprising (A) 100 weight parts acrylic rubber, (B) 0.5 to 30 weight parts cured silicone particulate containing an amino group-containing silicon compound, (C) 10 to 150 weight parts reinforcing filler, and (D) vulcanizing agent in a quantity sufficient to vulcanize component (A).

2. The composition of claim 1 wherein the cured silicone particulate (B) contains from 0.1 to 10 weight parts of amino group-containing silicon compound per 100 weight parts of silicone composition which can be cured.

3. The composition of claim 2 wherein the silicone composition which can be cured comprises a polyorganosiloxane containing silicon-bonded alkenyl, organohydrogenpolysiloxane containing silicon-bonded hydrogen, and a platinum-type catalyst.

4. The composition of claim 2 wherein the silicone composition which can be cured comprises a polyorganosiloxane containing silanol, organohydrogenpolysiloxane or alkoxysilane, and curing catalyst.

5. The composition of claim 4 wherein the silicone composition which can be cured comprises a hydroxy-terminated polydiorganosiloxane, a methylhydrogenpolysiloxane, and a tin-containing catalyst.

6. The composition of claim 2 wherein the amino group-containing silicon compound is an amino group-containing organoalkoxysilane.

* * * * *